United States Patent
Ozaki

(10) Patent No.: US 10,252,785 B2
(45) Date of Patent: Apr. 9, 2019

(54) SIDE-MOUNT TYPE ENGINE CONTROL APPARATUS

(71) Applicant: NHK SPRING CO., LTD., Yokohama-shi, Kanagawa (JP)

(72) Inventor: Taishi Ozaki, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 15/873,192

(22) Filed: Jan. 17, 2018

(65) Prior Publication Data
US 2018/0215456 A1   Aug. 2, 2018

(30) Foreign Application Priority Data

Jan. 27, 2017   (JP) .................. 2017-013161

(51) Int. Cl.
*B63H 21/21*   (2006.01)
*G05G 1/04*   (2006.01)
(Continued)

(52) U.S. Cl.
CPC ........... *B63H 21/213* (2013.01); *B63H 21/28* (2013.01); *F16H 59/0278* (2013.01);
(Continued)

(58) Field of Classification Search
CPC ...... B63H 21/21; B63H 21/213; B63H 21/22; G05G 1/04; G05G 5/02; G05G 5/03; G05G 5/04; G05G 5/06; G05G 5/065; G05G 5/08; Y10T 74/20612; Y10T 74/20232; Y10T 74/20624; Y10T 74/2011
(Continued)

(56) References Cited

U.S. PATENT DOCUMENTS

| 4,119,186 A | 10/1978 | Choudhury et al. |
| 4,632,232 A * | 12/1986 | Kolb ..................... B63H 21/213 |
| | | 192/99 S |

(Continued)

FOREIGN PATENT DOCUMENTS

| JP | 57153311 A | 9/1982 |
| JP | 04193696 A | 7/1992 |

(Continued)

OTHER PUBLICATIONS

Extended European Search Report (EESR) dated Jun. 14, 2018 issued in counterpart European Application No. 18152136.0.

*Primary Examiner* — Prasad V Gokhale
(74) *Attorney, Agent, or Firm* — Holtz, Holtz & Volek PC

(57) ABSTRACT

An engine control apparatus includes an apparatus body, and a control lever. The apparatus body includes a housing, an axis unit including a drive gear, a driven gear, and an angle sensor. A plurality of fixing portions are provided on the housing. A through-hole is formed in the fixing portion. The through-hole is communicated with a first side wall and a second side wall of the housing. The housing is fixed to a port-side mounting surface or a starboard-side mounting surface by a screw member inserted into the through-hole. When the control lever is operated, the drive gear and the driven gear are rotated in accordance with an angle of operation. A rotational angle of the driven gear is detected by an angle sensor.

5 Claims, 9 Drawing Sheets

(51) Int. Cl.
*G05G 5/04* (2006.01)
*G05G 5/02* (2006.01)
*G05G 5/06* (2006.01)
*B63H 20/14* (2006.01)
*F16H 59/02* (2006.01)
*F16H 59/10* (2006.01)
*F02B 61/04* (2006.01)
*F02D 11/04* (2006.01)

(52) U.S. Cl.
CPC ............. *F16H 59/105* (2013.01); *G05G 1/04* (2013.01); *G05G 5/02* (2013.01); *G05G 5/04* (2013.01); *G05G 5/06* (2013.01); *G05G 5/065* (2013.01); *B63H 2021/216* (2013.01); *F02B 61/045* (2013.01); *F02D 11/04* (2013.01); *Y10T 74/2011* (2015.01); *Y10T 74/20232* (2015.01); *Y10T 74/20612* (2015.01)

(58) Field of Classification Search
USPC .................................................. 74/523, 527
See application file for complete search history.

(56) References Cited

U.S. PATENT DOCUMENTS

| | | |
|---|---|---|
| 7,247,066 B2 | 7/2007 | Harada et al. |
| 9,086,135 B2* | 7/2015 | Washino ................. F16H 59/10 |
| 9,454,175 B2* | 9/2016 | Ozaki ...................... G05G 1/06 |
| 2006/0046585 A1 | 3/2006 | Harada et al. |
| 2012/0077394 A1* | 3/2012 | Banks ................. B63H 21/213 440/1 |
| 2015/0033897 A1* | 2/2015 | Washino ................. F16H 59/10 74/473.15 |
| 2015/0253802 A1* | 9/2015 | Ozaki ...................... G05G 1/06 74/523 |
| 2018/0032098 A1* | 2/2018 | Sugiyama ................ G05G 1/04 |

FOREIGN PATENT DOCUMENTS

| | | |
|---|---|---|
| JP | 2015032226 A | 2/2015 |
| JP | 2015166225 A | 9/2015 |

\* cited by examiner

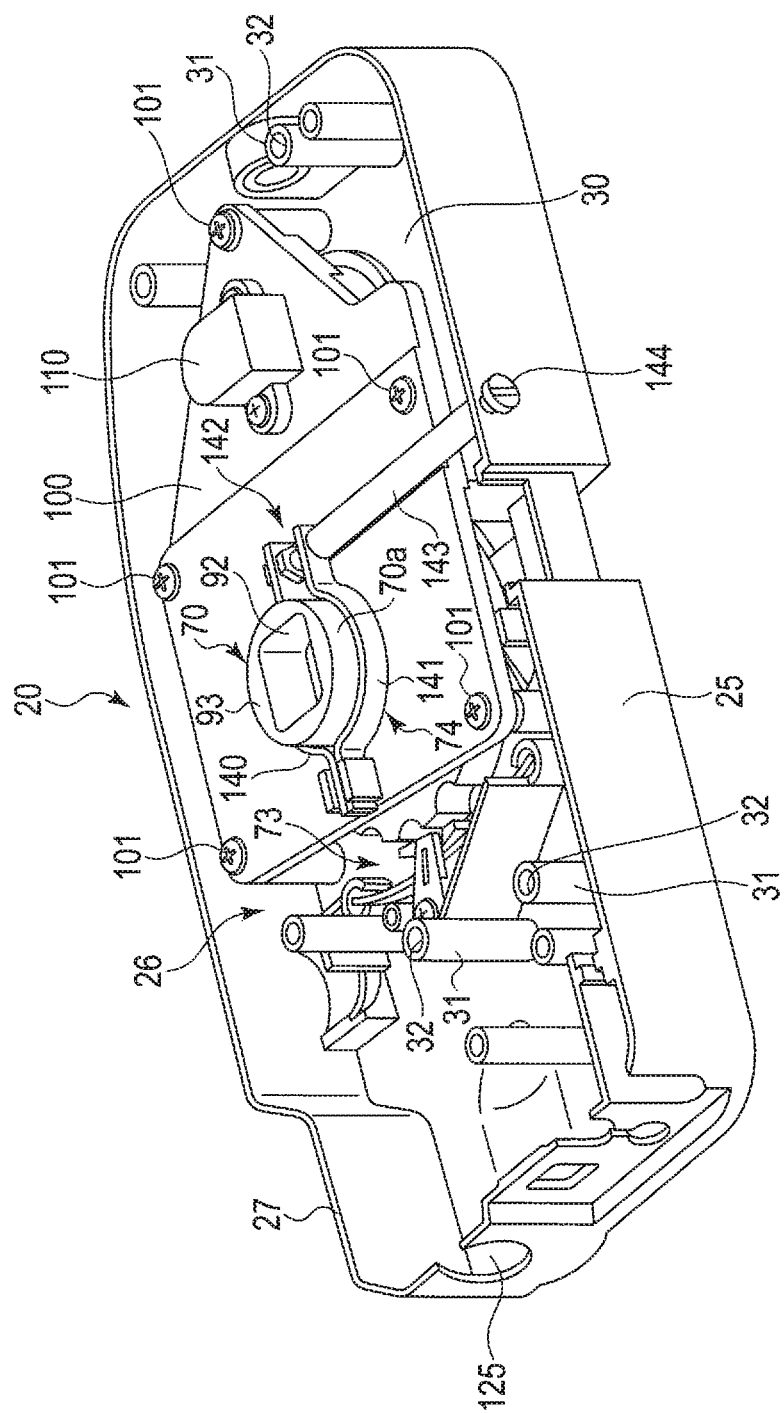
F I G. 5

SIDE-MOUNT TYPE ENGINE CONTROL APPARATUS

CROSS-REFERENCE TO RELATED APPLICATIONS

This application is based upon and claims the benefit of priority from prior Japanese Patent Application No. 2017-013161, filed Jan. 27, 2017, the entire contents of which are incorporated herein by reference.

BACKGROUND OF THE INVENTION

1. Field of the Invention

The present invention relates to a side-mount type engine control apparatus for performing a throttle operation, etc., of an engine of a boat, for example.

2. Description of the Related Art

In an engine system for a boat including an engine (an internal-combustion engine) as a power source, an engine control apparatus which performs a shift operation and a throttle operation by a control lever is known. In JPH4-193696 A (Patent Literature 1) and JP 2015-166225 A (Patent Literature 2), a side-mount type engine control apparatus is described. A mount is provided on a hull. A housing of the side-mount type engine control apparatus is fixed to a mounting surface of a vertical wall of the mount by a bolt. A control lever is provided in the housing. Inside the housing, a shift actuator and a throttle actuator connected with the control lever are arranged. In JP 2015-032226 A (Patent Literature 3), a top-mount type engine control apparatus is described. A housing of the top-mount type engine control apparatus is inserted in an opening formed on an upper wall of a mount provided on a hull from above the mount. Further, a flange portion of the housing is fixed to a mounting surface of the upper wall of the mount by a bolt.

The engine control apparatus includes a control lever. When the control lever is moved to a forward-side shift position or a reverse-side shift position from a neutral position, a mechanical transmission cable for shift is moved to a shift position on the forward side or the reverse side. When the control lever is further rotated, the control lever enters a throttle operation range. In the throttle operation range, as a mechanical transmission cable for throttle is moved in accordance with an operating angle of the control lever, throttle control is performed. In other words, a movement of the control lever is transmitted to the engine via the mechanical transmission cables.

A top-mount type engine control apparatus can be used in a medium-sized or large-sized boat having a relatively large cockpit and a dedicated mount without problems. However, a top-mount type engine control apparatus may not be used in a small boat in which the size of the mount is limited. In contrast, the side-mount type engine control apparatus has a structure in which the housing is fixed to a side surface of the mount. Accordingly, the side-mount type engine control apparatus has an advantage that it can be easily mounted on a relatively small boat. However, in a case of a boat in which a high-power engine is mounted on a small hull, the side-mount type engine control apparatus is required to operate mechanical transmission cables with great force. Accordingly, shifting or throttle operability is deteriorated.

In an engine control apparatus which uses the mechanical transmission cables, a part of the transmission cables, and movable members such as a shift arm and a throttle arm are arranged inside the housing. A movable range of these movable members is relatively large. The engine control apparatus is fixed to the mounting surface of the hull by a bolt. This bolt penetrates the housing. Accordingly, it is difficult to arrange the bolt in the housing such that it does not interfere with the movable members. Moreover, the housing must have high rigidity so that it can withstand a reaction force produced when the movable members move. Thus, one idea was to form a fixing portion such as a flange near an outer periphery of the housing, and fix this fixing portion to the mount by a bolt. However, a problem in the above is that the shape of the housing having the flange is restricted, and moreover, a contour of the housing is enlarged.

BRIEF SUMMARY OF THE INVENTION

An object of the present invention is to provide a side-mount type engine control which can easily operate a control lever, and includes a housing which is structured to be slim and compact.

A side-mount type engine control apparatus of one embodiment comprises a housing, an axis unit, a control lever, a drive gear, a driven gear, a sensor mounting plate, an angle sensor, and a fixing portion formed on the housing. The axis unit is provided rotatably in the housing. The control lever is mounted on the axis unit, and is rotated to a forward side or a reverse side from a neutral position. The drive gear is rotated together with the axis unit. The driven gear meshes with the drive gear. The sensor mounting plate is arranged between a first side wall and a second side wall of the housing. The angle sensor is arranged on the sensor mounting plate. The fixing portion includes a through-hole. This through-hole is communicated with the first side wall and the second side wall of the housing. In the through-hole, a screw member is inserted. By this screw member, the housing is fixed to a mounting surface.

According to this embodiment, it is possible to provide a side-mount type engine control apparatus which is capable of performing a throttle operation, etc., of the control lever with relatively small force, has good operability, and is configured to be slim and compact. Moreover, the engine control apparatus of the present embodiment can be mounted on a port-side mounting surface or a starboard-side mounting surface of a mount provided on a hull.

In a preferred embodiment, a friction mechanism which applies friction to the axis unit is provided. The friction mechanism comprises a brake member, an adjustment screw, and an operation portion. The brake member is in contact with a peripheral surface of the axis unit. The adjustment screw adjusts a pressure force of the brake member on the peripheral surface of the axis unit. The operation portion rotates the adjustment screw.

An example of the control lever includes a lever body fixed to the axis unit, and a cover member arranged on the lever body. The cover member is attachable to either of a first surface of the lever body and a second surface on an opposite side of the first surface.

Further, one embodiment comprises a detent plate provided on the axis unit, a holding member such as a ball or a roller, and a spring. The holding member is engageable with a recess formed on a peripheral surface of the detent plate. The spring urges the holding member toward the peripheral surface of the detent plate.

According to one embodiment, a first fitting portion, a second fitting portion, a first lever mounting portion, a second lever mounting portion, a joint member, and a center bolt are provided. The first fitting portion is formed on a boss portion on a lower end side of the control lever. The second fitting portion is provided on a side opposite to the first fitting portion of the boss portion. The first lever mounting portion includes a first recess formed on one end portion of the axis unit. The second lever mounting portion includes a second recess formed on the other end portion of the axis unit. The joint member includes a coupling portion fitted to one of the first fitting portion and the second fitting portion. Further, the joint member includes a rotation prevention coupling portion fitted into one of the first recess and the second recess. The center bolt fixes the boss portion and the joint member to the axis unit. In this embodiment, a head of the center bolt may be accommodated in the first recess or the second recess of the axis unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a perspective view showing a friction mechanism of the engine control apparatus.

DETAILED DESCRIPTION OF THE INVENTION

A side-mount type engine control apparatus 10 according to one embodiment will be described with reference to FIGS. 1 to 9.

Figure 1:
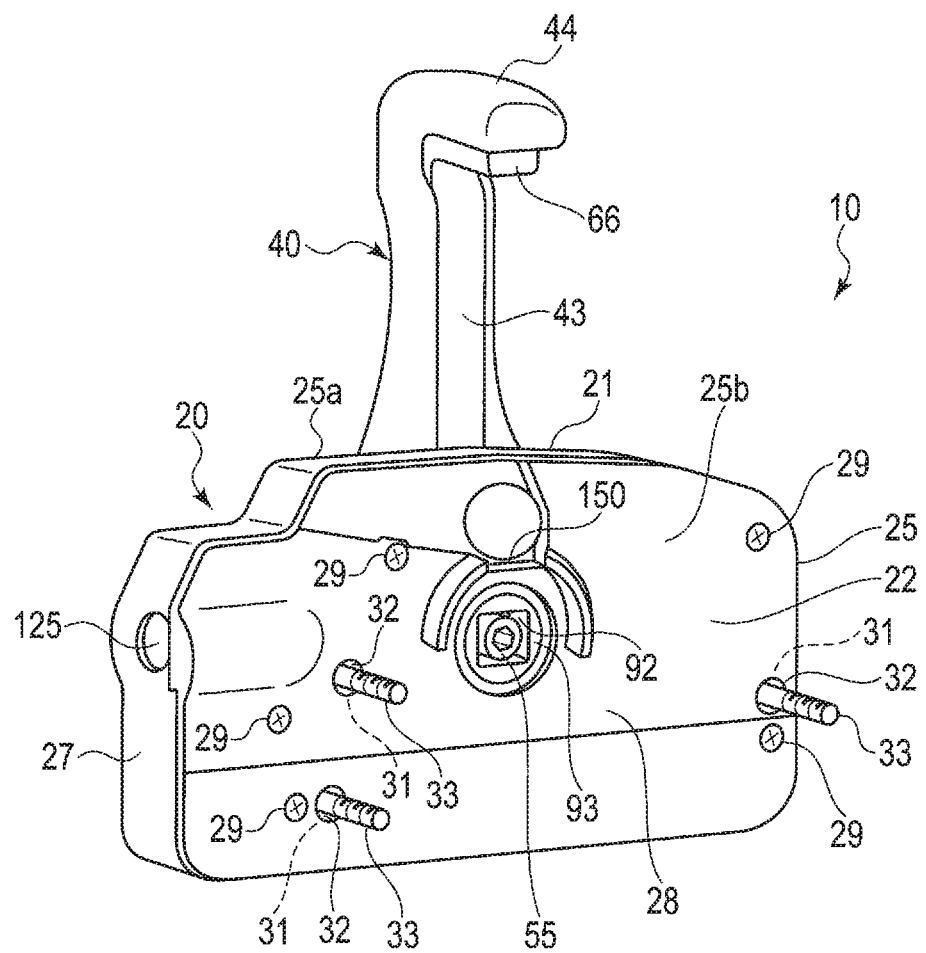
FIG. 1 is a perspective view of a side-mount type engine control apparatus according to one embodiment, and a control lever is provided along a first side surface of an apparatus body.
Figure 2:
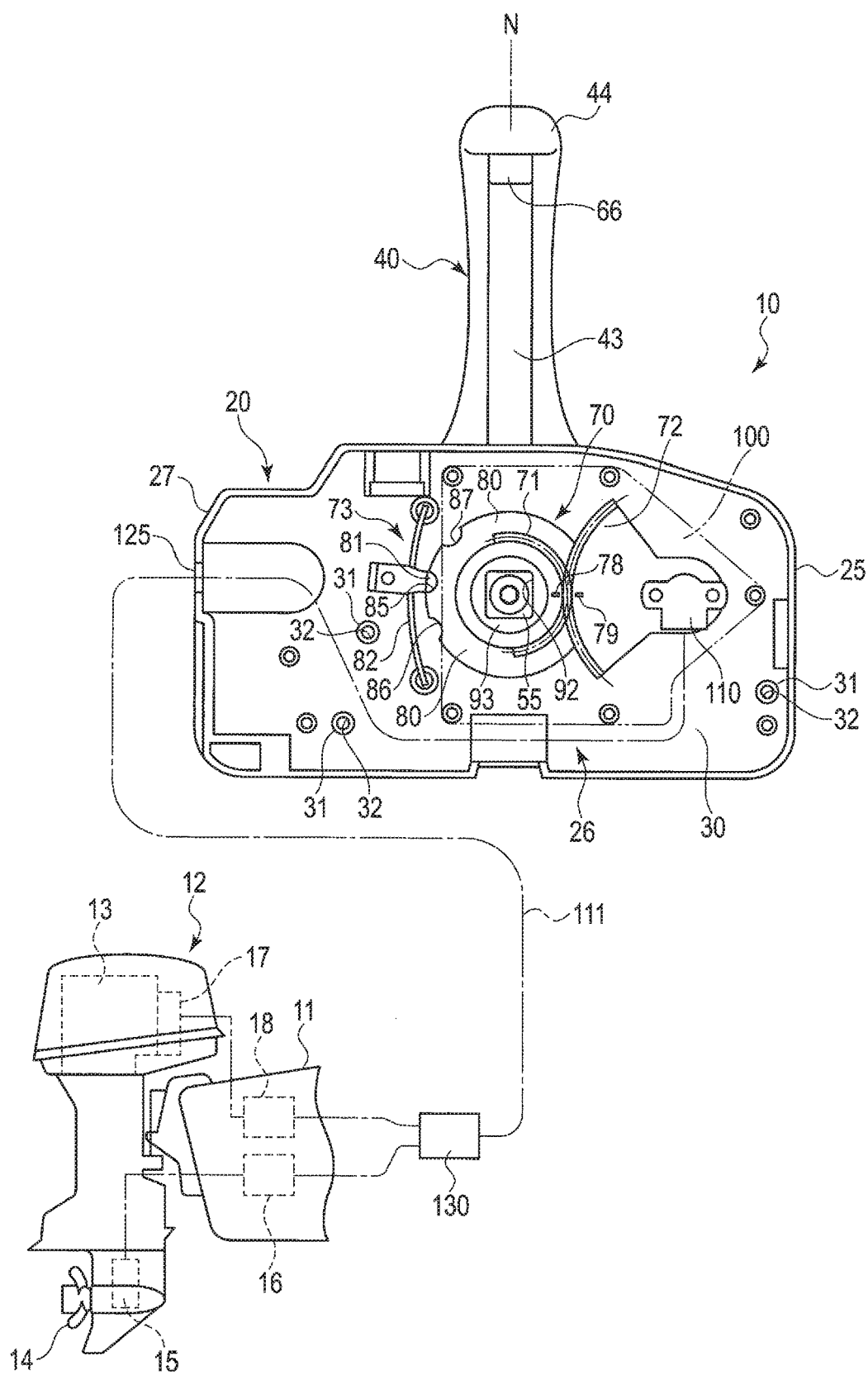
FIG. 2 is a side view showing the interior of the engine control apparatus, and an outboard motor.

FIG. 1 illustrates the side-mount type engine control apparatus 10. FIG. 2 illustrates the interior of the engine control apparatus 10, and an example of an outboard motor 12 mounted in the rear of a hull 11. The outboard motor 12 includes a propeller 14, a shift mechanism 15, a shift actuator 16, a throttle mechanism 17, a throttle actuator 18, etc. The propeller 14 rotates with an engine (an internal-combustion engine) 13 used as a source of power.

Figure 3:
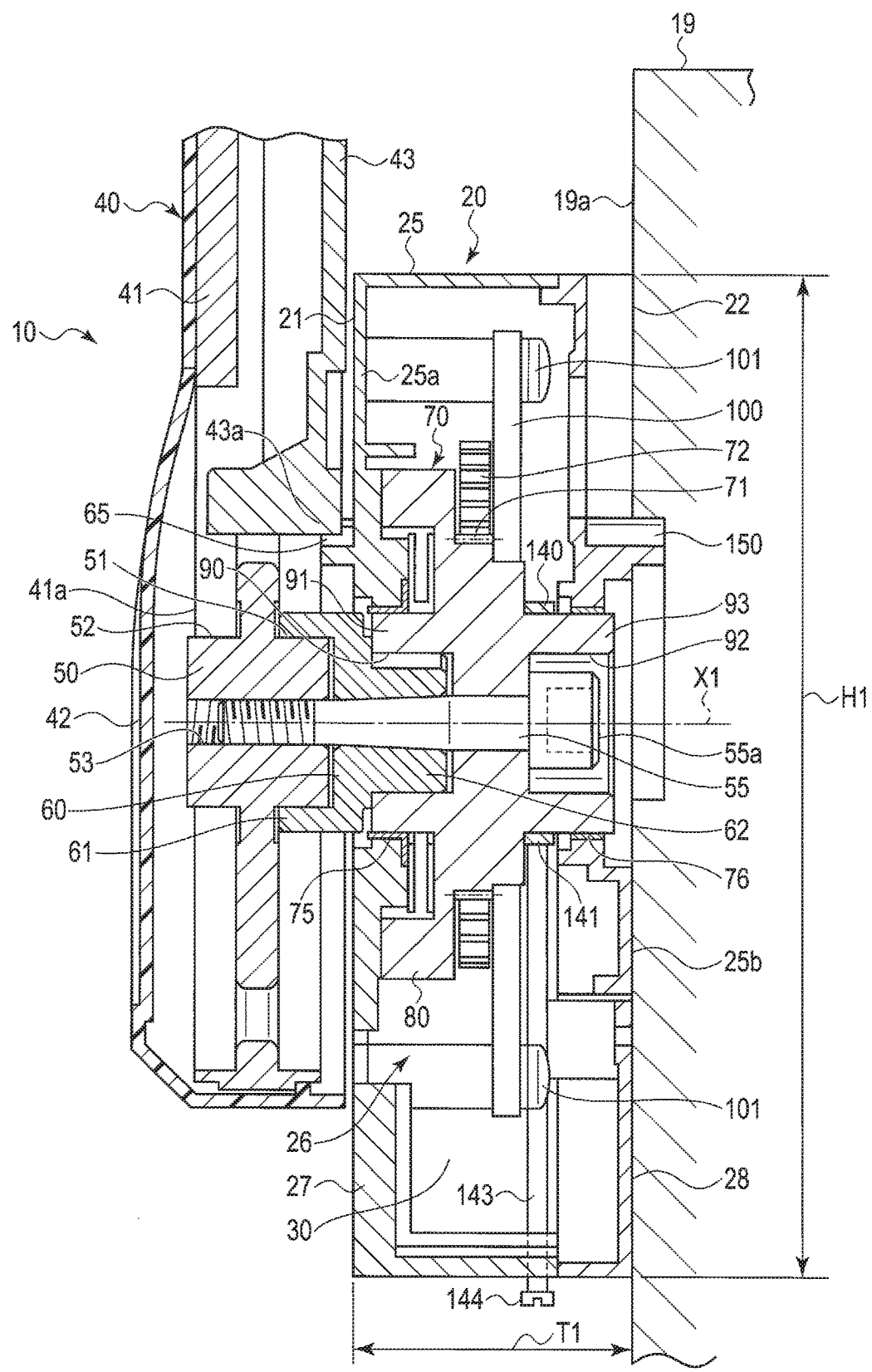
FIG. 3 is a vertical sectional view of a part of the engine control apparatus.

FIG. 3 is a vertical sectional view of a part of the engine control apparatus 10. A mount 19 is provided on the hull. The engine control apparatus 10 is mounted on a port-side mounting surface 19a of the mount 19. The mount 19 is provided near a cockpit of the hull. The engine control apparatus 10 includes an apparatus body 20, and a control lever 40. The control lever 40 can be mounted on either side of the two side surfaces (i.e., a first side surface 21 and a second side surface 22) of the apparatus body 20. The first side surface 21 and the second side surface 22 are located on sides opposite to each other with respect to a thickness direction of the apparatus body 20. The control lever 40 of the engine control apparatus 10 shown in FIG. 3 is mounted along the first side surface 21 of the apparatus body 20.

The apparatus body 20 includes a housing 25 and a mechanism part 26. The housing 25 is made of rust-resistant metal such as an aluminum alloy. The mechanism part 26 is accommodated inside the housing 25. The housing 25 is comprised of a first housing element 27 and a second housing element 28. The first housing element 27 includes a first side wall 25a. The second housing element 28 includes a second side wall 25b. The first housing element 27 and the second housing element 28 are connected to each other by a screw member 29 (FIG. 1).

As shown in FIG. 3, the first side wall 25a and the second side wall 25b of the housing 25 are substantially parallel to each other. Each of the first side wall 25a and the second side wall 25b extends vertically along the mounting surface 19a of the mount 19. A thickness T1 of the housing 25 is less than a height H1 of the housing 25. Inside the housing 25, an internal space 30 for accommodating the mechanism part 26 is formed. The mechanism part 26 will be described in detail later.

In order to fix the apparatus body 20 on the mount 19, a fixing portion 31 (see, for example, FIGS. 1 and 2) is formed at a plurality of places (for example, three places) of the housing 25. The number of fixing portions 31 may be other than three. The fixing portion 31 extends in a thickness direction (horizontal direction) of the housing 25 between the first side wall 25a and the second side wall 25b of the housing 25. In each of the fixing portions 31, a through-hole 32 is formed. Each of the through-holes 32 is communicated with the first side wall 25a and the second side wall 25b in the thickness direction of the housing 25. In the through-hole 32, a screw member 33 for fixing the apparatus body 20 on the mount 19 is inserted.

The control lever 40 includes a lever body 41, a cover member 42 made of resin, and a lock member 43. The lever body 41 is made of rust-resistant metal such as an aluminum alloy. The cover member 42 is mounted on the lever body 41. The lock member 43 is movable up and down. On an upper end of the control lever 40, a handle portion 44 having such a shape that can be gripped by a boat operator by hand is provided. The cover member 42 is mounted on a first surface 41a of the lever body 41.

As shown in FIG. 3, on a lower end side of the lever body 41, a boss portion 50 is formed. On the boss portion 50, a first fitting portion 51 and a second fitting portion 52, which are bilaterally symmetric with respect to each other, are formed. The first fitting portion 51 and the second fitting portion 52 face sides opposite to each other. At the center of the boss portion 50, a female thread portion 53 is formed. A center bolt 55 is screwed into the female thread portion 53. The control lever 40 is fixed to an axis unit 70 by the center bolt 55.

On the boss portion 50 of the control lever 40, a joint member 60 is provided. The joint member 60 includes a coupling portion 61 and a rotation prevention coupling portion 62. The coupling portion 61 has such a shape that it can be fitted to either of the first fitting portion 51 and the second fitting portion 52. The rotation prevention coupling portion 62 is shaped in a form other than circular, that is, shaped to be substantially rectangular, for example, as seen from a side surface of the control lever 40. FIG. 3 illustrates the state in which the coupling portion 61 is fitted to the first fitting portion 51.

The lock member 43 provided on the control lever 40 is urged downward by a spring. A lower end 43a of the lock member 43 can be fitted to a first receiving portion 65 when the control lever 40 is at a neutral position (neutral). The first receiving portion 65 is formed on the first side wall 25a of the housing 25. At an upper end of the lock member 43, an operation portion 66 for unlocking is provided. When this operation portion 66 is pulled up by a finger, the lower end 43a of the lock member 43 can be disengaged from the first receiving portion 65.

Figure 4:
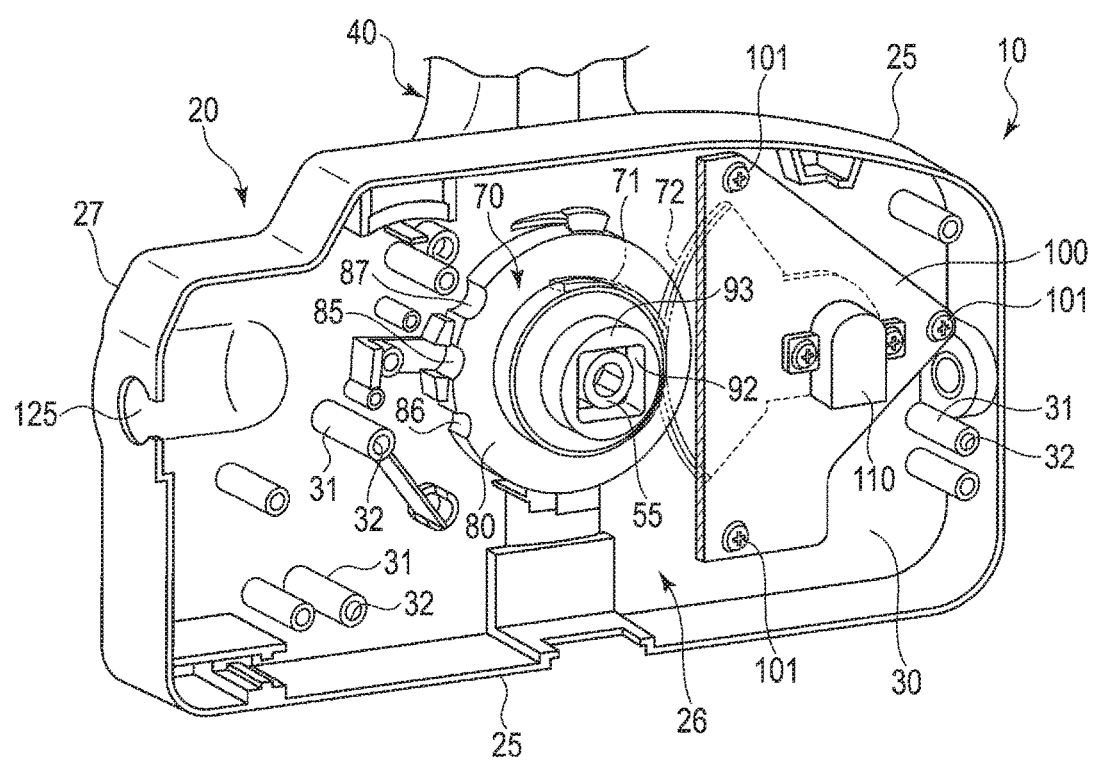
FIG. 4 is a perspective view showing the interior of the apparatus body of the engine control apparatus.

FIG. 4 is a perspective view showing the interior of the apparatus body 20. In the internal space 30 of the housing 25, the mechanism part 26 is arranged. The mechanism part 26 includes the axis unit 70, a driven gear 72, a detent mechanism 73 (FIG. 2), and a friction mechanism 74 (FIG. 5). The axis unit 70 includes a drive gear 71. The driven gear 72 meshes with the drive gear 71. The friction mechanism 74 applies friction to the axis unit 70. The drive gear 71 rotates together with the axis unit 70. The axis unit 70 is rotatably supported by bearings 75 and 76 (FIG. 3). That is, the axis unit 70 is rotated about axis X1 (FIG. 3) extending horizontally with respect to the housing 25. Accordingly, the control lever 40 can be rotated about axis X1 of the axis unit 70.

Each of the drive gear 71 and the driven gear 72 is composed of a spur gear. These gears 71 and 72 are arranged parallel to the first side wall 25a and the second side wall 25b of the housing 25. The drive gear 71 and the driven gear 72 are sector gears partially having teeth formed thereon, and mesh with each other in an angular range in which the control lever 40 is rotated. On the drive gear 71 and the driven gear 72, marks 78 and 79 (FIG. 2) are shown. The marks 78 and 79 are matched with each other when the control lever 40 is at the neutral position.

A plurality of fixing portions 31 are provided on the housing 25. These fixing portions 31 are formed at positions (dead space) where they do not interfere with a movable member (a rotating body) in the internal space 30 of the housing 25. The movable members intended in this specification are, for example, the axis unit 70, the drive gear 71, and the driven gear 72. In other words, these fixing portions 31 are arranged by using the dead space occupying part of the internal space 30 of the housing 25.

As shown in FIG. 2, the detent mechanism 73 includes a detent plate 80, a holding member 81, and a spring 82. The detent plate 80 is provided on the axis unit 70. The holding member 81 is composed of a roller or a ball. The spring 82 urges the holding member 81 toward a peripheral surface of the detent plate 80. On the peripheral surface of the detent plate 80, a neutral recess 85, a forward recess 86, and a reverse recess 87 are formed.

When the control lever 40 is at a neutral position N, the holding member 81 falls into the neutral recess 85. In this way, the control lever 40 is kept in the neutral position N. When the control lever 40 is moved to a forward-side shift position F (FIG. 6), the holding member 81 falls into the forward recess 86. In this way, the control lever 40 is kept in the forward-side shift position F. When the control lever 40 is moved to a reverse-side shift position R, the holding member 81 falls into the reverse recess 87. In this way, the control lever 40 is kept in the reverse-side shift position R.

As shown in FIG. 3, on one of end portions (i.e., the end portion on the left side in FIG. 3) of the axis unit 70, a first lever mounting portion 91 is provided. The first lever mounting portion 91 includes a first recess 90. The first recess 90 has such a shape that the rotation prevention coupling portion 62 of the joint member 60 can be fitted. Also, the first recess 90 has a size which allows a head 55a of the center bolt 55 to be inserted therein.

On the other end portion (i.e., the end portion on the right side in FIG. 3) of the axis unit 70, a second lever mounting portion 93 is provided. The second lever mounting portion 93 includes a second recess 92. The second recess 92 has such a shape that the rotation prevention coupling portion 62 of the joint member 60 can be fitted. Also, the second recess 92 has a size which allows the head 55a of the center bolt 55 to be inserted therein.

A sensor mounting plate 100 is provided on the first housing element 27. The sensor mounting plate 100 is arranged between the first side wall 25a and the second side wall 25b of the housing 25. The sensor mounting plate 100 is fixed to the first housing element 27 by a screw member 101. The sensor mounting plate 100 and the first side wall 25a are substantially parallel to each other. On the sensor mounting plate 100, an angle sensor 110 is arranged. The angle sensor 110 outputs an electrical signal according to a rotational position of the driven gear 72. The driven gear 72 meshes with the drive gear 71. Accordingly, the position (operating angle) of the control lever 40 is detected by the angle sensor 110. A portion to be detected (for example, a magnet) of the angle sensor 110 is arranged on the driven gear 72.

As shown in FIG. 2, a wiring member (a harness) 111 is connected to the angle sensor 110. The wiring member 111 passes through the internal space 30 of the housing 25, and extends outside the housing 25 from a harness insertion hole 125. The wiring member 111 is connected to a control unit 130. The control unit 130 includes a control circuit such as a microcomputer. The control unit 130 controls the shift actuator 16 and the throttle actuator 18 in accordance with an electrical signal output from the angle sensor 110. The shift actuator 16 operates the shift mechanism 15 by way of a force transmission member such as a push-pull cable and a link member. The throttle actuator 18 operates the throttle mechanism 17 by way of a force transmission member such as a push-pull cable and a link member.

As shown in FIG. 5, the friction mechanism 74 includes band-shaped brake members 140 and 141, and an adjustment portion 142. The brake members 140 and 141 are in contact with a peripheral surface 70a of the axis unit 70. The adjustment portion 142 adjusts frictional force of the brake members 140 and 141. The adjustment portion 142 includes an adjustment screw 143. The adjustment screw 143 adjusts a pressure force of the brake members 140 and 141 on the peripheral surface 70a of the axis unit 70. An operation portion 144 of the adjustment screw 143 is disposed outside the housing 25. By rotating the adjustment screw 143 by the operation portion 144, the frictional force of the brake members 140 and 141 can be adjusted.

FIG. 3 shows the state in which the apparatus body 20 is fixed to the port-side mounting surface 19a of the mount 19. The control lever 40 is fixed to the first lever mounting portion 91 by the center bolt 55 so as to be along the first side surface 21 of the apparatus body 20. More specifically, the coupling portion 61 of the joint member 60 is fitted to the first fitting portion 51 of the control lever 40. Further, the rotation prevention coupling portion 62 of the joint member 60 is fitted into the first recess 90 of the axis unit 70. In this state, the boss portion 50 of the control lever 40 is fixed to the first lever mounting portion 91 by the center bolt 55. The joint member 60 is sandwiched between the boss portion 50 and the first lever mounting portion 91. The head 55a of the center bolt 55 is accommodated in the second recess 92.

An action of engine control apparatus 10 of the present embodiment will be described below.

Figure 6:
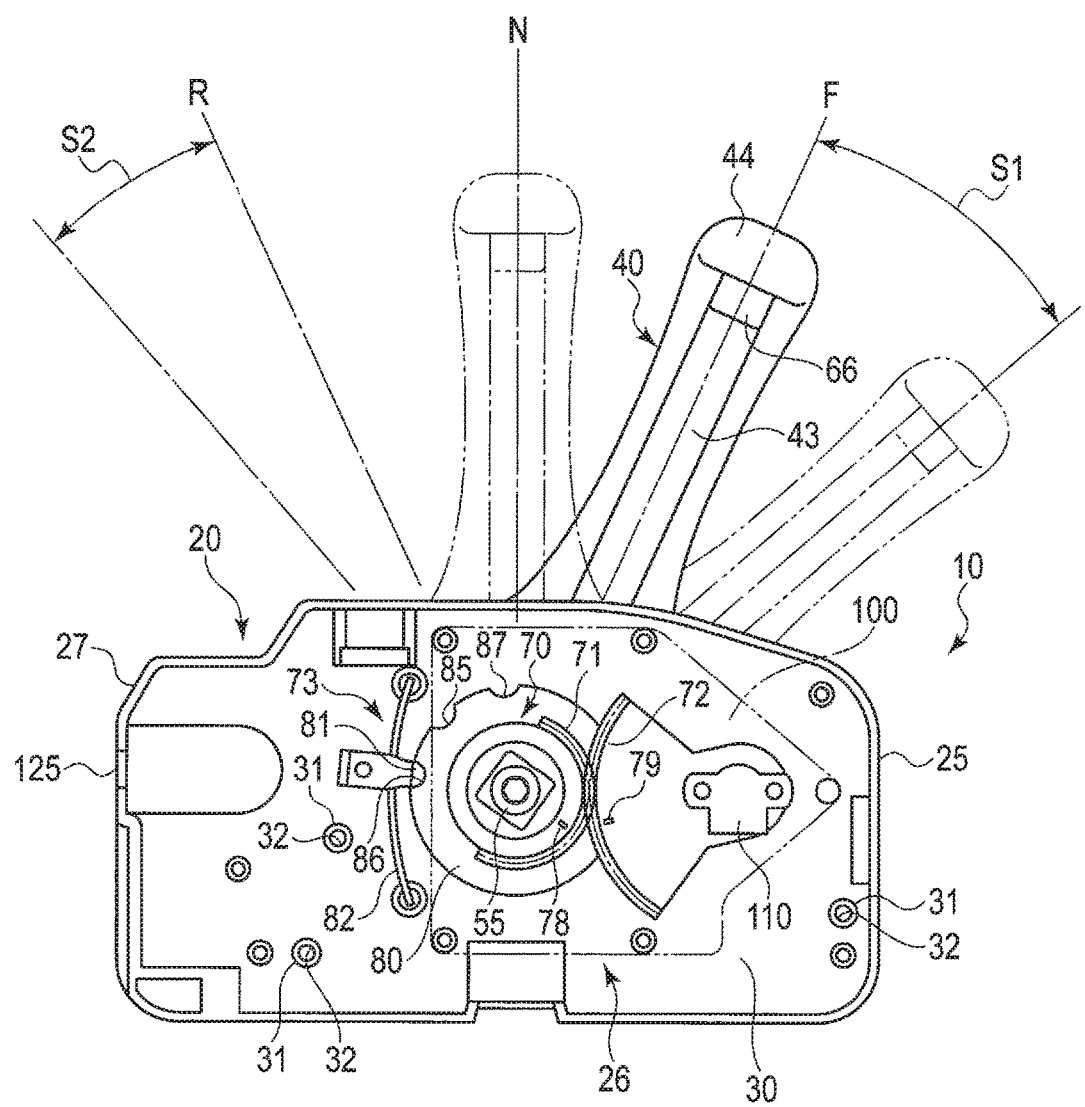
FIG. 6 is a side view of the control lever of the engine control apparatus being operated.

As shown in FIG. 6, the control lever 40 can be rotated within a throttle operation range S1 through the forward-side shift position F. The neutral position (neutral) N serves as a boundary point. Also, the control lever 40 can be rotated within a throttle operation range S2 through the reverse-side shift position R.

When the control lever 40 is moved to the forward-side shift position F from the neutral position N, the axis unit 70 is rotated in a first direction. Consequently, the drive gear 71 and the driven gear 72 are rotated. Thus, an electrical signal indicating that the control lever 40 has moved to the forward-side shift position F is output to the control unit 130 (FIG. 2) from the angle sensor 110. The shift actuator 16 is thereby switched from neutral to a forward-side shift position.

When the control lever 40 is moved to be in the throttle operation range S1 from the forward-side shift position F, the drive gear 71 and the driven gear 72 are further rotated in accordance with an angle of the control lever 40. Accordingly, an electrical signal according to the angle of the control lever 40 is output to the control unit 130 from the angle sensor 110. In this way, the throttle actuator 18 is controlled, and the propeller 14 is rotated at a rotation speed according to a throttle opening.

When the control lever 40 is moved to the reverse-side shift position R from the neutral position N, the axis unit 70 is rotated in a second direction. Consequently, the drive gear 71 and the driven gear 72 are rotated. Thus, an electrical signal indicating that the control lever 40 has moved to the reverse-side shift position R is output to the control unit 130 from the angle sensor 110. The shift actuator 16 is thereby switched from neutral to a reverse-side shift position.

When the control lever 40 is moved to be in the throttle operation range S2 from the reverse-side shift position R, the drive gear 71 and the driven gear 72 are further rotated in accordance with an angle of the control lever 40. Accordingly, an electrical signal according to the angle of the control lever 40 is output to the control unit 130 from the angle sensor 110. In this way, the throttle actuator 18 is controlled, and the propeller 14 is rotated at a rotation speed according to the throttle opening.

Figure 7:
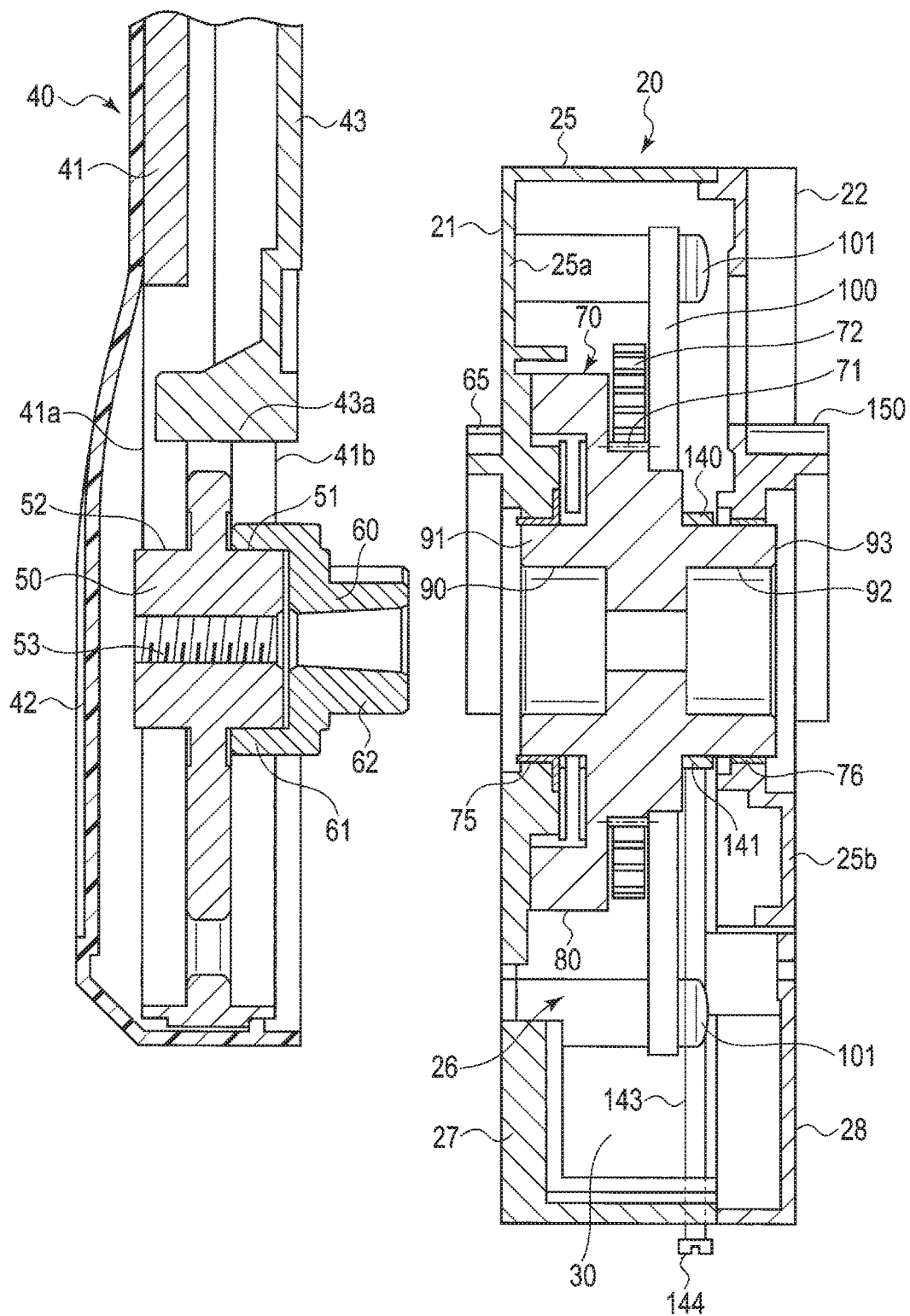
FIG. 7 is a vertical sectional view of the control lever in a state in which it is removed from the apparatus body of the engine control apparatus.
Figure 8:
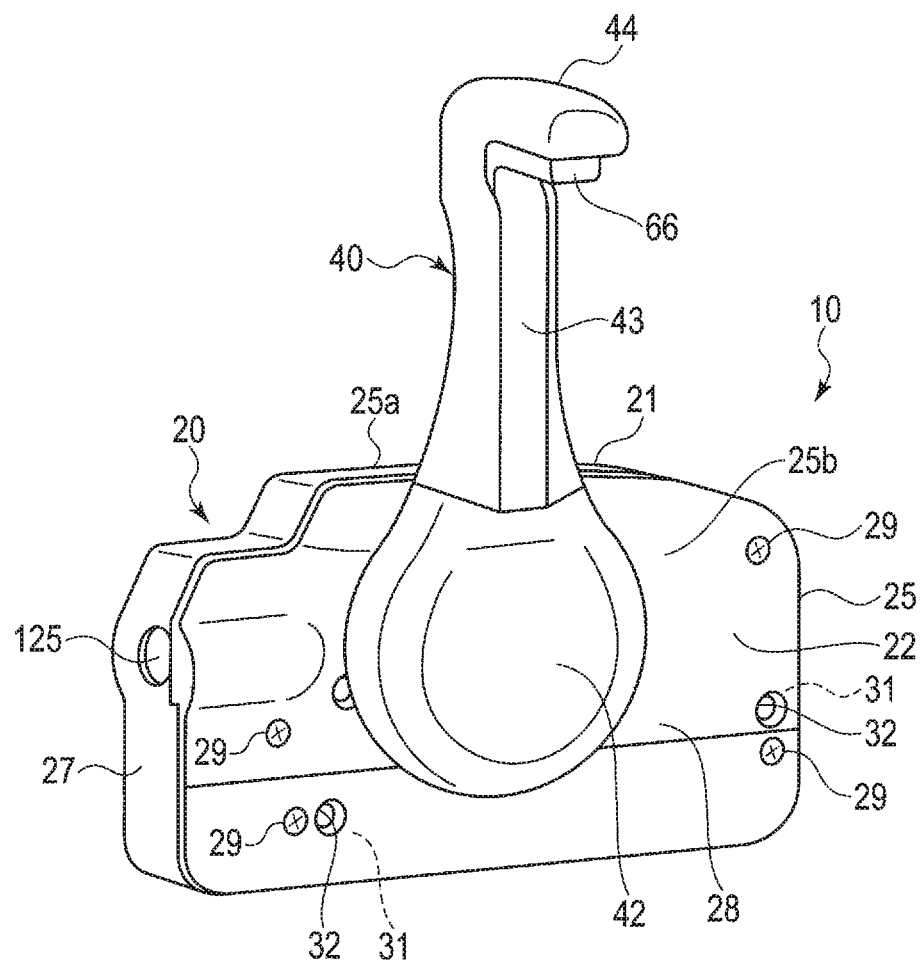
FIG. 8 is a perspective view of the control lever of the engine control apparatus being provided along a second side surface of the apparatus body.

Depending on a boat, the engine control apparatus 10 is desired to be arranged on a starboard-side mounting surface 19b (FIG. 9) of the mount 19. In such a case, by removing the center bolt 55 from the boss portion 50 of the control lever 40, the control lever 40 is removed from the apparatus body 20. FIG. 7 shows the state in which the control lever 40 is removed from the apparatus body 20. The removed control lever 40 is arranged along the second side surface 22 of the apparatus body 20 as shown in FIG. 8.

Figure 9:
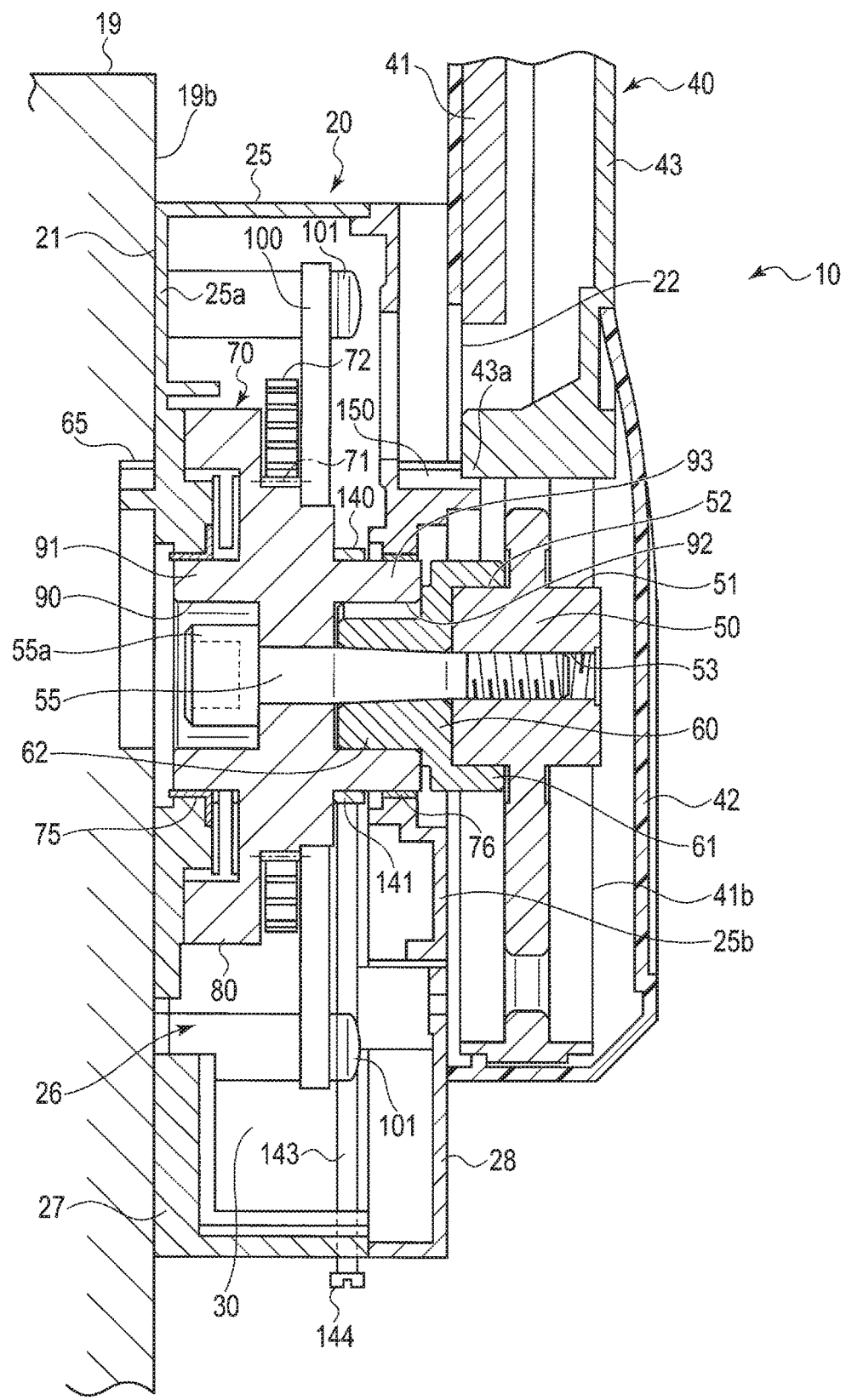
FIG. 9 is a vertical sectional view of the engine control apparatus shown in FIG. 8.

FIG. 9 shows the state in which the engine control apparatus 10 is mounted on the starboard-side mounting surface 19b. In this case, the coupling portion 61 of the joint member 60 is fitted to the second fitting portion 52 of the boss portion 50 of the control lever 40. Further, the rotation prevention coupling portion 62 of the joint member 60 is fitted into the second recess 92 of the axis unit 70. The boss portion 50 of the control lever 40 is fixed to the second lever mounting portion 93 by the center bolt 55. The joint member 60 is sandwiched between the boss portion 50 and the second lever mounting portion 93. The head 55a of the center bolt 55 is accommodated in the first recess 90. The cover member 42 is mounted on a second surface 41b (i.e., a surface on the opposite side of the first surface 41a) of the lever body 41.

The lock member 43 is provided on the control lever 40. The lower end 43a of the lock member 43 can be fitted to a second receiving portion 150 when the control lever 40 is at the neutral position (neutral). The second receiving portion 150 is formed on the second side wall 25b of the housing 25. When the operation portion 66 for unlocking is pulled up by a finger, the lower end 43a of the lock member 43 is disengaged from the second receiving portion 150.

The engine control apparatus 10 of the present embodiment includes the control unit 130. The operating angle of the control lever 40 is input to the control unit 130 via the angle sensor 110 and the wiring member 111. Consequently, the shift mechanism 15 and the throttle mechanism 17 can be actuated by an electrical signal. Accordingly, in the engine control apparatus 10 of the present embodiment, there is no need to arrange a mechanical push-pull cable for force transmission inside the housing 25.

Moreover, the drive gear 71 and the driven gear 72 are arranged parallel to the first side wall 25a and the second side wall 25b in space between the first side wall 25a and the second side wall 25b of the housing 25. The angle sensor 110 is arranged between the second side wall 25b and the sensor mounting plate 100. Accordingly, the thickness T1 (FIG. 3) of the housing 25 can be made smaller than that of a conventional engine control apparatus, and the housing 25 can be made slim (compact).

Also, in the engine control apparatus 10 of the present embodiment, there is no need to arrange a movable member whose movable range is large such as a shift movable arm and a throttle movable arm inside the housing 25. Accordingly, a plurality of fixing portions 31 can be arranged in the internal space (dead space) 30 of the housing 25. Thus, positions where the fixing portions 31 are to be provided and the shape of the housing 25 can be determined with more freedom, and the housing 25 can be structured to be compact. By these fixing portions 31, the apparatus body 20 is fixed to the mount 19.

Further, in the side-mount type engine control apparatus 10 according to the present embodiment, the fixing portion 31 extends in a thickness direction (a horizontal direction) of the housing 25. Further, in the fixing portion 31, the through-hole 32 which is communicated with the first side wall 25a and the second side wall 25b of the housing 25 is formed. By the screw member 33 inserted into this through-hole 32, the apparatus body 20 can be arranged on either the port-side mounting surface 19a or the starboard-side mounting surface 19b.

In the engine control apparatus 10 of the present embodiment, a portion to be detected (for example, a magnet) for the angle sensor 110 is provided on the driven gear 72. In other words, the portion to be detected does not need to be provided on the axis unit 70. Accordingly, the first lever mounting portion 91 and the second lever mounting portion 93 can be formed on the axis unit 70. By this feature, the control lever 40 can be disposed on either side of the first side surface 21 and the second side surface 22 of the apparatus body 20. Consequently, the engine control apparatus 10 can be mounted on either of the port-side mounting surface and the starboard-side mounting surface.

Further, in the engine control apparatus 10 of the present embodiment, the brake members 140 and 141 are made to contact the peripheral surface 70a of the axis unit 70. Moreover, the engine control apparatus 10 of the present embodiment has been devised to make the frictional force of the brake members 140 and 141 adjustable by the adjustment screw 143. By this feature, not only can a moderate degree of frictional force be applied to the control lever 40, but movement of the control lever 40 by vibration, etc., can also be prevented.

Note that the engine control apparatus 10 of the present embodiment can be used for an electrically-powered boat which rotates a propeller by an electric motor. Since the electric motor does not require a shift mechanism, it suffices that a forward-side accelerator control range and a reverse-side accelerator control range be set in the control lever. Accordingly, in a detent plate of the detent mechanism of the electrically-powered boat, it is necessary to provide only the neutral recess 85.

In carrying out the present invention, it is needless to say that the shape, structure, and arrangement of the respective members which constitute the side-mount type engine control apparatus, such as the housing, control lever, fixing portion, axis unit, drive gear, driven gear, and angle sensor, may be modified variously.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A side-mount type engine control apparatus comprising:
    a housing;
    an axis unit provided rotatably in the housing;
    a control lever which is mounted on the axis unit, and is rotatable to a forward side or a reverse side from a neutral position;
    a drive gear which rotates together with the axis unit;
    a driven gear which meshes with the drive gear;
    a sensor mounting plate arranged between a first side wall and a second side wall of the housing;
    an angle sensor arranged on the sensor mounting plate;
    a fixing portion which is provided to the housing, and includes a through-hole into which a screw member for fixing the housing to a mounting surface is insertable, the through-hole being communicated with the first side wall and the second side wall of the housing;
    a first fitting portion provided on a boss portion on a lower end side of the control lever;
    a second fitting portion provided on a side opposite to the first fitting portion of the boss portion;
    a first lever mounting portion including a first recess provided on a first end portion of the axis unit;
    a second lever mounting portion including a second recess provided on a second end portion of the axis unit;
    a joint member including a coupling portion fitted to one of the first fitting portion and the second fitting portion, and a rotation prevention coupling portion fitted into one of the first recess and the second recess; and
    a center bolt which fixes the boss portion and the joint member to the axis unit.

2. The engine control apparatus of claim 1, further comprising a friction mechanism which applies friction to the axis unit,
    wherein the friction mechanism comprises:
    brake members in contact with a peripheral surface of the axis unit;
    an adjustment screw which adjusts a pressure force of the brake members on the peripheral surface of the axis unit; and
    an operation portion which rotates the adjustment screw.

3. The engine control apparatus of claim 1, wherein the control lever includes a lever body fixed to the axis unit, and a cover member arranged on the lever body, and the cover member is attachable to either of a first surface of the lever body and a second surface on an opposite side of the first surface.

4. The engine control apparatus of claim 1, further comprising:
    a detent plate provided on the axis unit;
    a holding member engageable with a recess formed on a peripheral surface of the detent plate; and
    a spring which urges the holding member toward the peripheral surface of the detent plate.

5. The engine control apparatus of claim 1, wherein a head of the center bolt is accommodated in the first recess or the second recess of the axis unit.

* * * * *